(12) United States Patent
Bennett (10) Patent No.: US 7,316,154 B1
(45) Date of Patent: Jan. 8, 2008

(54) SEALS WITH INTEGRATED LEAK PROGRESSION DETECTION CAPABILITY

(75) Inventor: Barton E Bennett, Mishawaka, IN (US)

(73) Assignee: Odyssian Technology, LLC, Mishawaka, IN (US)

(*) Notice: Subject to any disclaimer, the term of this patent is extended or adjusted under 35 U.S.C. 154(b) by 105 days.

(21) Appl. No.: 11/090,527

(22) Filed: Mar. 25, 2005

Related U.S. Application Data

(60) Provisional application No. 60/556,158, filed on Mar. 25, 2004.

(51) Int. Cl.
*F16J 15/02* (2006.01)
(52) U.S. Cl. .......................... 73/52; 277/320
(58) Field of Classification Search ............... 73/52
See application file for complete search history.

(56) References Cited

U.S. PATENT DOCUMENTS 3,789,297 A * 1/1974 Frolich ..................... 324/694
6,257,332 B1 * 7/2001 Vidrine et al. ......... 166/250.15

* cited by examiner

*Primary Examiner*—Hezron Williams
*Assistant Examiner*—Paul M West
(74) *Attorney, Agent, or Firm*—Baker & Daniels LLP (57) ABSTRACT

A multifunctional seal that in one embodiment includes on each contact surface multiple redundant seals, sensors and sensor circuitry between each seal, and a power source and embedded electronic components and circuitry within the central core region. The seal is constructed to detect fluid leak progression using redundant sealing and sensors located between each set of seals to allow for the detection of leak propagation prior to leakage outside the sealed containment or transfer structure.

36 Claims, 11 Drawing Sheets

SEALS WITH INTEGRATED LEAK PROGRESSION DETECTION CAPABILITY

BACKGROUND OF THE INVENTION

This application claims the benefit of U.S. Provisional Patent Application Ser. No. 60/556,158 filed Mar. 25, 2004, the complete disclosure of which is hereby expressly incorporated by reference.

The present invention pertains to a multifunctional seal that provides both seal and leak detection functionality. Redundant sealing is provided to enable the detection of leak progression of fluids in either gas or liquid phase. Leak progression detection is the detection of a propagating leak, which may be detected prior to leakage outside the sealed containment structure. Some examples of use include seals in containment and transfer systems having hazardous or environmentally damaging fluids, seals for mechanical devices having refrigerant, coolant, lubricating, or fuel fluids, and seals for structure that provides separation of dissimilar material phase, environmental, or energy state.

Fluid seals are made of a variety of materials and have a multitude of design configurations that include, but are not limited to, (i) a circular conformable elastomer O-ring seated in a channel (gland) of a metallic or plastic fitting, (ii) circular washer made of soft conformable metallic or plastic material, (iii) flat gasket of various flat pattern made with conformable fibrous, cellulous, particulate, or polymeric material, (iv) circular compression fittings with off-set tapered mating surfaces, (v) circular flared fittings with conformable flared tubings, and (vi) circular threaded pipe fittings with off-set tapers, etc.

It is known that sealing using conformable materials is achieved when such material is placed between relatively rigid mating surfaces and that sealing occurs when the material displaces to conform to and fill the space between the mating surfaces.

It is also known that sealing of relatively rigid mating surfaces is achieved when such surfaces are in full or partial and often tight contact. Examples of such sealing are compression fittings and threaded pipefittings that often have tapered mating surfaces that are offset to create tight contact during rotational tightening.

Presently, leak detection is achieved using a multitude of devices that are external and separate from the fluid containment structure and seal. Such devices include, but may not be limited to: (i) stationary chemical detection alarms, (ii) handheld portable chemical detection sensors, and (iii) handheld portable sonic emission detectors. Other means for leak detection include the use of foaming agents (soap) and dye that provide visual identification of a leak.

It is also known that leaks may be identified through the use of pressure sensors that measure fluid pressure within the containment system. Such systems typically measure bulk fluid pressure using a single pressure sensing device. Other means for direct indication of a leak include the use of temperature sensors that measure fluid temperature within the containment system. Such systems typically measure localized temperature at a specific location within the system using a single temperature sensing device. Fluid leakage can be identified by a corresponding increase in temperature readings.

Typical leak detect methods and devices identify leaks after leakage has occurred outside the fluid containment structure.

A typical fluid containment structure provides a single containment wall without redundancy in containment structure.

Current fluid seals are configured and sized to provide a single seal barrier without sealing redundancy.

SUMMARY OF THE INVENTION

It is believed that these and other objects of the invention have been met by providing in one embodiment, a multifunctional seal with integrated leak progression detection and redundant sealing.

The invention is useable as a multifunctional seal with integrated circuitry and sensors to detect the progression of a fluid leak.

When used as a seal, it is believed that this invention provides greater leak control over related art. The integrated sensors detect the progression of a leak past single or multiple redundant seals. The seal can include single or multiple concentric sensing rings made up of sensors and supporting circuitry that identify the presence of a leaked fluid when fluid contacts the sensor causing a change in its electrical or optical response. If the first inner seal breaks down (leaks), the fluid travels to the first and inner sensor ring, causing a change in electrical reading and which then triggers the transmission of a unique modulated signal indicating the beginning of a leak at the specified seal. Multiple and/or concentric sensor rings allow for the identification of fluid leak propagation which senses the breakdown of a seal and the potential for a leak before the leak occurs.

In one embodiment of a multifunctional seal, the surface of the seal is soft enough to seal the mating connection fittings using materials such as lead or a soft polymer. Sensors and electrical or optical conductors are recessed in channels. In the event that a leak begins to propagate through the first seal surface, the fluid comes into contact with the sensor within the channel causing a change in electrical reading. The change in electrical or optical reading causes a control circuit to initiate the transmission of a signal that identifies the seal and indicates that the seal is beginning to break down and leak progression has occurred. The recessed sensor rings can be on both sides of the seal.

In another embodiment, the sensors, signal conductors and seals are on the surface of the seal ring. This type of seal ring can be fabricated using low cost printed circuit board fabrication techniques. Electrical conductive tracings that provide continuity to the sensors (sensor ring) may be chemical etched or electroplated as currently done with printed circuit boards (PCB). The sealing ring can be a soft metallic tracing, such as silver, that is resistant to fluid corrosion and has adequate softness to provide a good seal. This seal can have a raised sensor and seal rings on both sides of the seal.

In an additional embodiment, the sensors and signal conductors are on the surfaces of the seal ring, and the sealing is achieved using elastomer O-rings that are placed in channels or glands within the seal surface. Multiple concentric O-rings can be used to provide redundant sealing with leak detection sensors located between each set of O-rings. This same design may be achieved by using molded elastomer seals in place of the O-rings. Both sides of the seal have the O-rings, signal conductors and sensors.

Redundant sealing may be provided by using two O-rings and leak detection provided by a single sensor ring. Such a seal includes the redundant O-rings and sensor ring on both outer surfaces of the seal. A core is used to provide compressive strength and to protect the electronics and power source located within the core. This type of seal is self-contained or autonomous in that it includes the control circuitry and power supply within the seal. In the event of a seal leak, a modulated RF or induction signal is transmitted to a receiver/display module attached to an ID collar adjacent to the fitting.

In another embodiment, the seal is an integral part of a tapered compression fitting. The sensors and signal conductor rings are recessed into channels and the seal is provided by a tapered surface. A seal is achieved with tight contact between the tapered surfaces of the fitting, as done in conventional fittings. A similar embodiment has a seal insert that is separate from the compression fitting and has tapered geometry for use in compression fittings. Such an insert includes recessed sensors and signal conductors on both sides of the tapered insert.

In still another embodiment, a flat patterned seal (gasket) is provided. The sensors and signal conductors are typically in paths parallel to the edges of the flat patterned seal. The signal conductors and sensors are placed on the seal in surface depressions to assure adequate surface contact as may be required to achieve gasket sealing. Similar to the aforementioned embodiments, the sensors within the concentric and parallel sensor circuits detect the presence of leak propagation. In the event that a leak begins to propagate toward the gasket edge, the fluid comes into contact with the sensor within the first or inner sensor circuit causing a change in electrical or optical reading. The change in electrical reading causes a control circuit to initiate the transmission of a signal that identifies the gasket and indicates that the gasket is beginning to break down and leak progression has occurred.

The sensors used in multifunctional seals of the present invention may be provided with signal continuity by electrical or optical circuitry referred to herein as sensor circuitry or sensor rings. The electrical conductors may be made of conventional electrically conductive metallic material, such as copper, silver, aluminum, etc., or conductive polymeric or ink material of known art, including polymers or ink filled with conducting material including, but not limited to, powdered metal, graphite, or carbon particulates, single crystal nano-sized elements, or other electrically conductive matter.

Supporting sensor circuitry may include other materials and means of known art including the use of optical carriers, such as fiber optic filaments, optical wave guide films, etc.

The sensors are small to accommodate highly restrictive space limitations and include sensors of known art including, but not limited to, reactive conductor sensors, polymer composite sensors, capacitive sensors, conductive elastomer sensors, optical strain sensors, etc.

The multifunctional seal may be a discrete item or an integral part of a connection fitting.

The control circuitry and power and signal sources may be incorporated into the seal or located external to the seal. In one of the aforementioned embodiments, the seal has a sandwich construction and is autonomous (self-sustaining) with circuitry and power sources resident within the core region of the seal. In other aforementioned embodiments, the seals have the power and control circuitry located external to the seal with electrical power and signal connection provided through direct (hard wire) connections or via indirect connection of known art, such as electromagnetic induction, radiation frequency modulation, etc.

BRIEF DESCRIPTION OF THE DRAWINGS

The above-mentioned and other features and objects of this invention and the manner of obtaining them will become more apparent and the invention itself will be better understood by reference to the following embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which will be described below. It will nevertheless be understood that no limitation of the scope of the invention is thereby intended.

The invention includes any alterations and further modifications in the illustrated devices and described methods and further applications of the principles of the invention, which would normally occur to one skilled in the art to which the invention relates.

Figure 1:
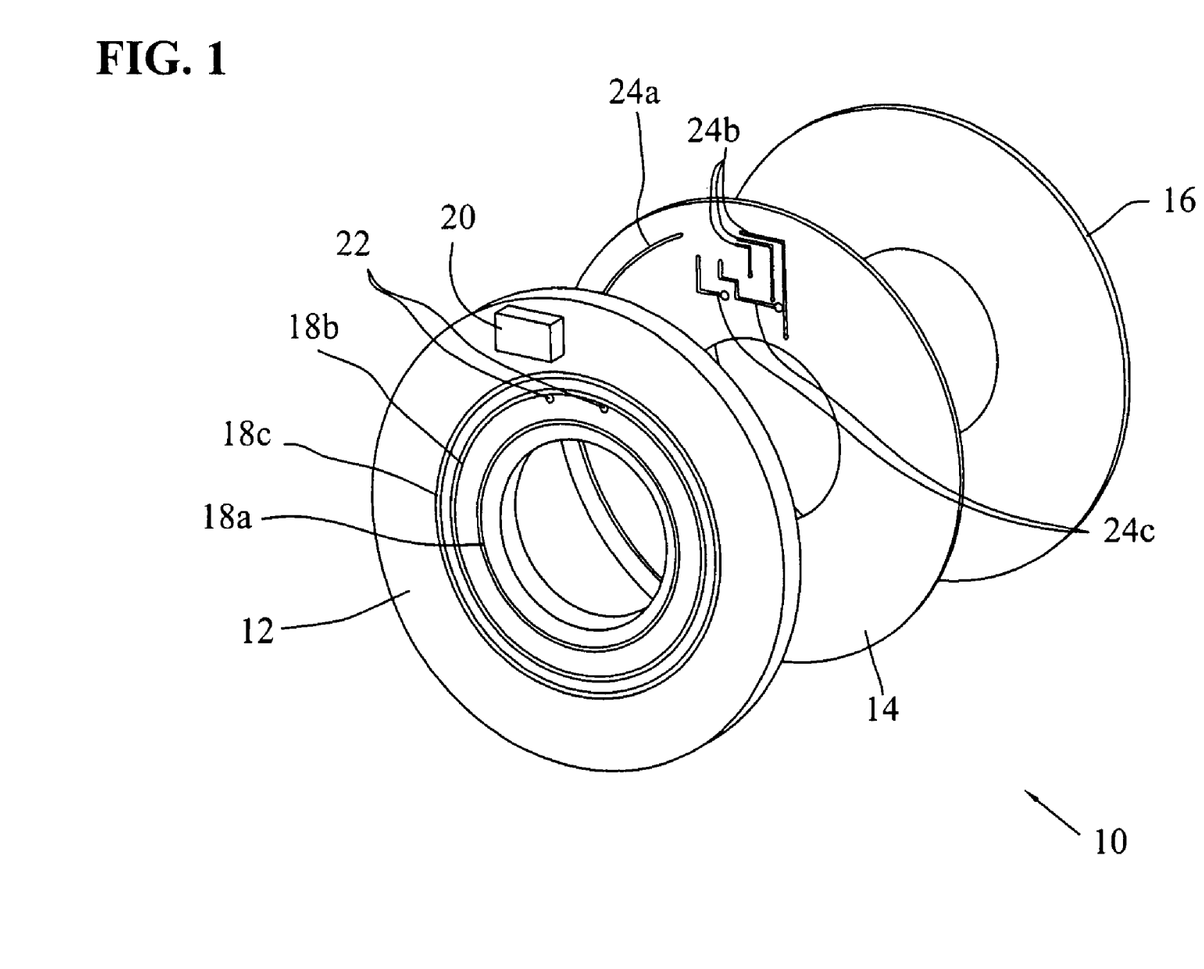
FIG. 1 shows a perspective exploded view of a multilayer seal ring having multiple leak detection sensor circuits located within recessed channels on opposing seal surfaces and having embedded circuitry with a resident integrated circuit (IC) control chip.
Figure 7A:
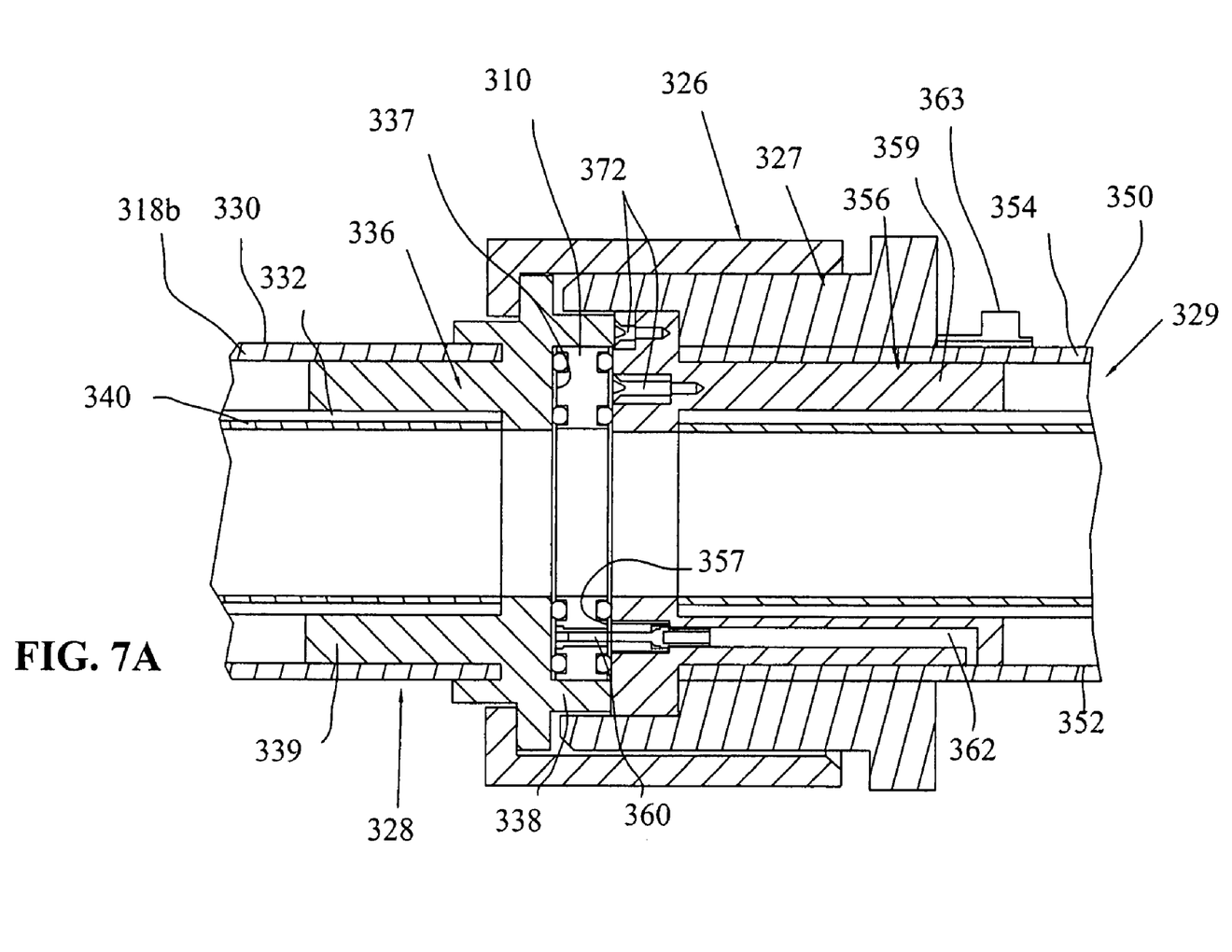
FIG. 7a shows a cross-sectional view of the seal of FIG. 6 shown placed within a connection fitting of a pipe.

Referring now to FIG. 1, an exploded view of one embodiment of a seal ring or member according to the present invention is generally indicated as 10. Seal ring 10 has a laminate structure including a contact face lamina 12, center core lamina 14, and opposing contact face lamina 16. Contact face laminas 12 and 16 have multiple sensor circuits/rings or sensing members 18a, 18b, 18c on the outer contact surfaces thereof that include electrical or optical conductors with small sensors of known art, such as reactive conductor sensors, capacitor sensors, optical strain sensors, or elastomer conductive sensors that detect the presence of a fluid or a change in pressure due to the presence of pressurized fluid. The sensor rings may be located in channels of grooves in contact face laminas 12 and 16 so that they are flush with the outer contact faces of the contact face laminas. Also included on lamina 12 is an integrated circuit (IC) chip 20 of known art that may include comparator circuits and transistor switches that identify changes in electrical readings and cause switching to initiate remote visual indication of leak progression or initiates the transmission of a modulated signal to a remote controller and display that identifies the seal and the presence of leak propagation. Seal ring 10 also includes two holes 22 extending therethrough that hold electrical terminations of known art that provide voltage and common ground to IC 20 and an adjacent pipe (not shown). Transfer of voltage and ground to the adjacent pipe may be achieved when adjacent pipes are mated such as shown in FIG. 7a. The center core lamina 14 is a low dielectric material or coated with a low dielectric material with conductive tracings that provide electrical circuitry for sensor ring 10 and IC 20. The lamina 16 has sensor rings (not visible in figure view) on its contact surface, similar to the sensor rings 18a, 18b, 18c shown on lamina 12.

Figure 2:
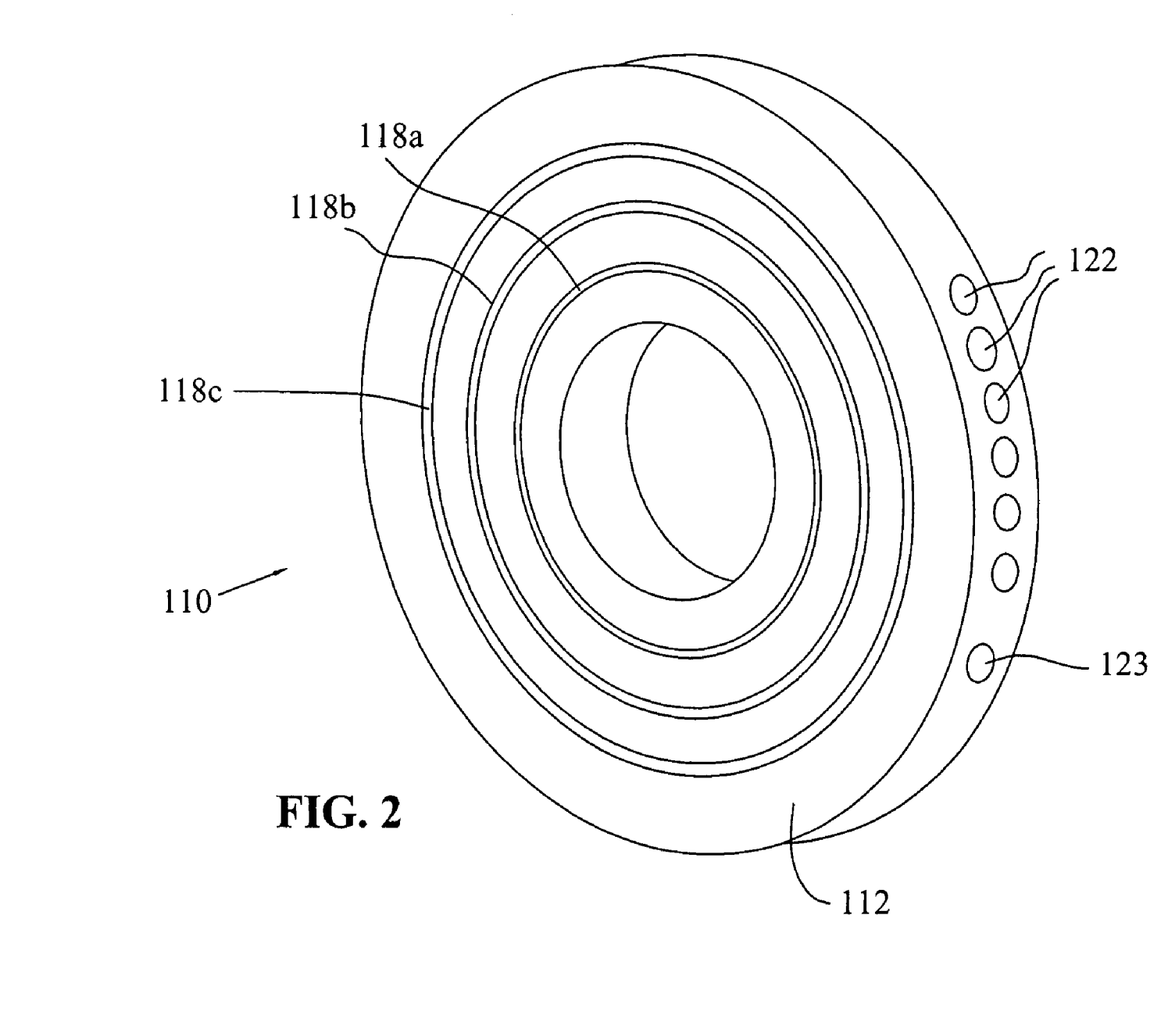
FIG. 2 shows an assembled perspective view of a multilayer seal assembly having multiple leak detection sensor circuits located within recessed channels on opposing seal surfaces and having embedded circuitry with control circuit similar to that of FIG. 1 with the IC control chip removed and located remote from the seal.

In FIG. 2, another embodiment of a seal ring is generally indicated as 110, which is similar to seal ring 10 except that the IC chip has been located remotely. Seal ring 110 has a contact face lamina 112, a center core lamina 114, and an opposing contact face lamina 116 (FIG. 3), and contact face laminas 112 and 116, each include concentric sensor circuits or rings 118a, 118b, 118c on the outside contact faces thereof. The rings 118a, 118b, 118c are located in channels or grooves so that they are flush with the outer contact faces of the contact face laminas. Also shown are voltage and ground electrical contacts 122 and 123, respectively. Electrical continuity between the electrical contacts 122 and 123 and the sensor rings 118a, 118b, 118c is achieved with embedded electrical conductor circuits, either molded into a solid body or surface-deposited onto an embedded ply of a multilayer laminated body as is known and such as shown in FIG. 1.

Figure 3:
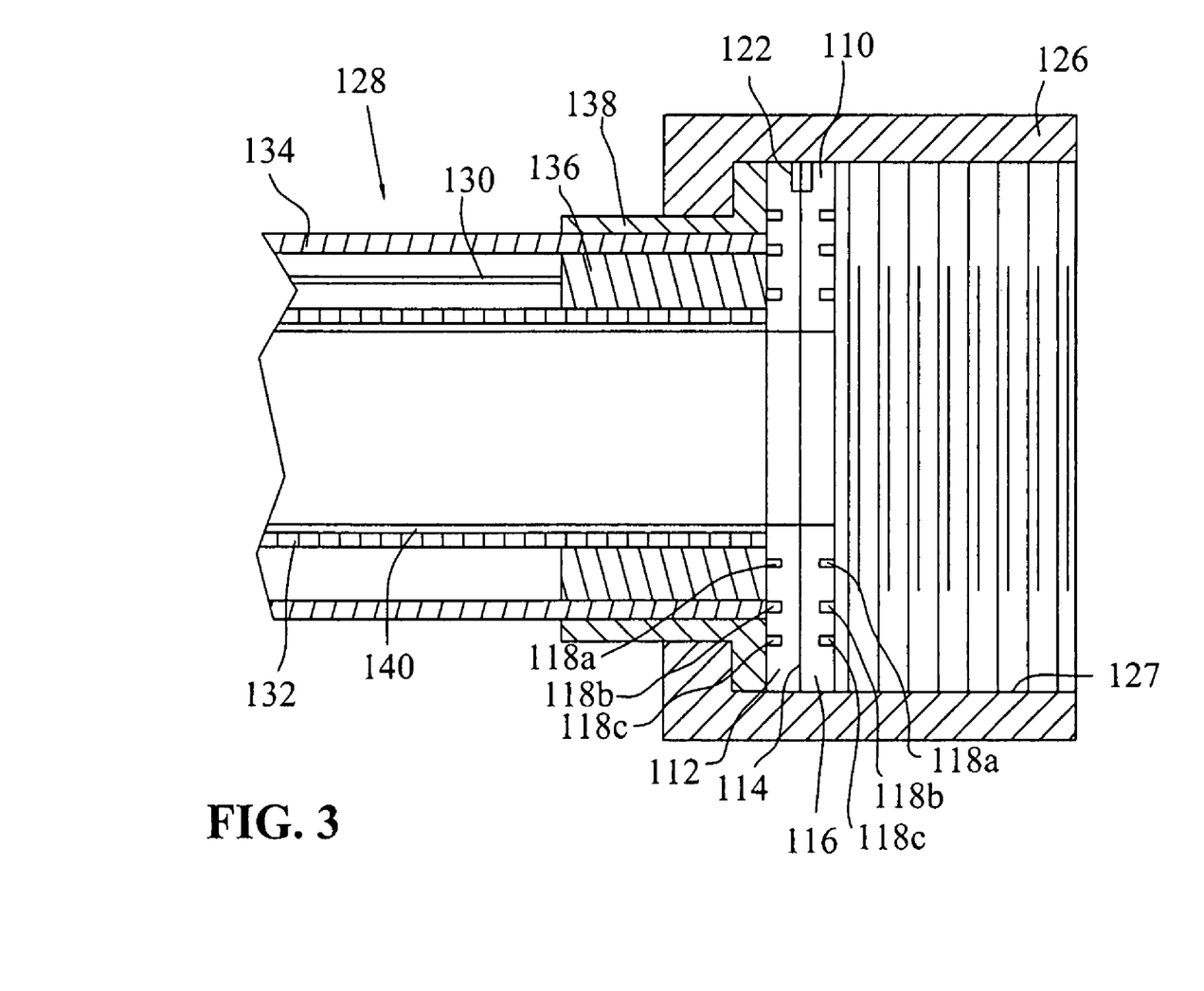
FIG. 3 shows a cross-sectional view of the seal of FIG. 2 shown placed within a female connection fitting of a pipe.

Now referring to FIG. 3, a cross-sectional view is shown with seal ring 110 placed in a female fitting 126 having internal threads 127 that is attached to a pipe assembly generally indicated as 128. The cross-sectional view shows the recessed channels containing the sensor rings 118a, 118b, 118c. As shown, power from a remote source is provided through a conductor 130 that makes contact with the seal electrical contacts 122 and 123. Shown in FIG. 3 is the cross-sectional view of one of the multiple electrical contacts 122.

It should be noted that the pipe assemblies shown in FIGS. 3, 5 and 7a through 7c all include dual walled pipes with electrical conductors located on the outside of the outer pipe and/or within the space between the outer pipe and inner pipe walls. These pipe assembly configurations are but one of multiple possible pipe configurations. In FIG. 3, the electrical conductor 130 provides electrical power and ground to the seal ring 110 and transfers power and ground to an adjacent pipe segment (not shown). In this embodiment, electrical conductor 130 routes between an inner pipe 132 and an outer pipe 134 through a cylindrical fitting insert 136, up through the outer pipe 134, a flange 138, and up to the radial contacts 122 and 123. The cross-section of the seal 110 shows the thin embedded laminate layer 114 that contains the electrical conductor circuitry that connects the radial terminations 122 and 123 with the sensor rings 118a, 118b, 118c. The dual walled pipe assembly 128 also includes a pipe liner 140. It should be appreciated that the flange 138 holds the female fitting 126 in place when the female fitting is threaded onto a male fitting (not shown).

Another pipe or pipe assembly (not shown) can be threaded into threads 127 on the inner diameter of female fitting 126, and it is contemplated that the pipe would have the same inner diameter as pipe assembly 128, although the fitting could be used to change to a different pipe diameter. In operation, seal ring 110 is designed to preclude a fluid or gas contained within the inner diameter of pipe assembly 128 and the other pipe to be inserted into female fitting 126 from leaking at the joint connection. The seal provides progressive leak protection and monitoring. For example, if the seal between the inner diameter of pipe assembly 128 and sensor ring 118a is breached, a signal may be transmitted to provide a visual, audio or other type indication that leakage has occurred to the first sensor ring. Then if the seal in the area between sensor rings 118a and 118b is breached, sensor 118b will provide a similar signal. If a signal is received from the outermost sensor ring 118c, then it is known that a complete breach or failure of the seal is progressing. A leak between seal ring 110 and the pipe to be inserted in female fitting 127 will provide similar type leak indications from the sensor rings 118a, 118b, 118c on that side of seal ring 110.

The surface of seals on 8 and 11 is soft enough to seal with the mating connection fittings, such as shown in FIG. 3, and the contact surface may be made, for example, from a lead or soft polymer.

Figure 4:
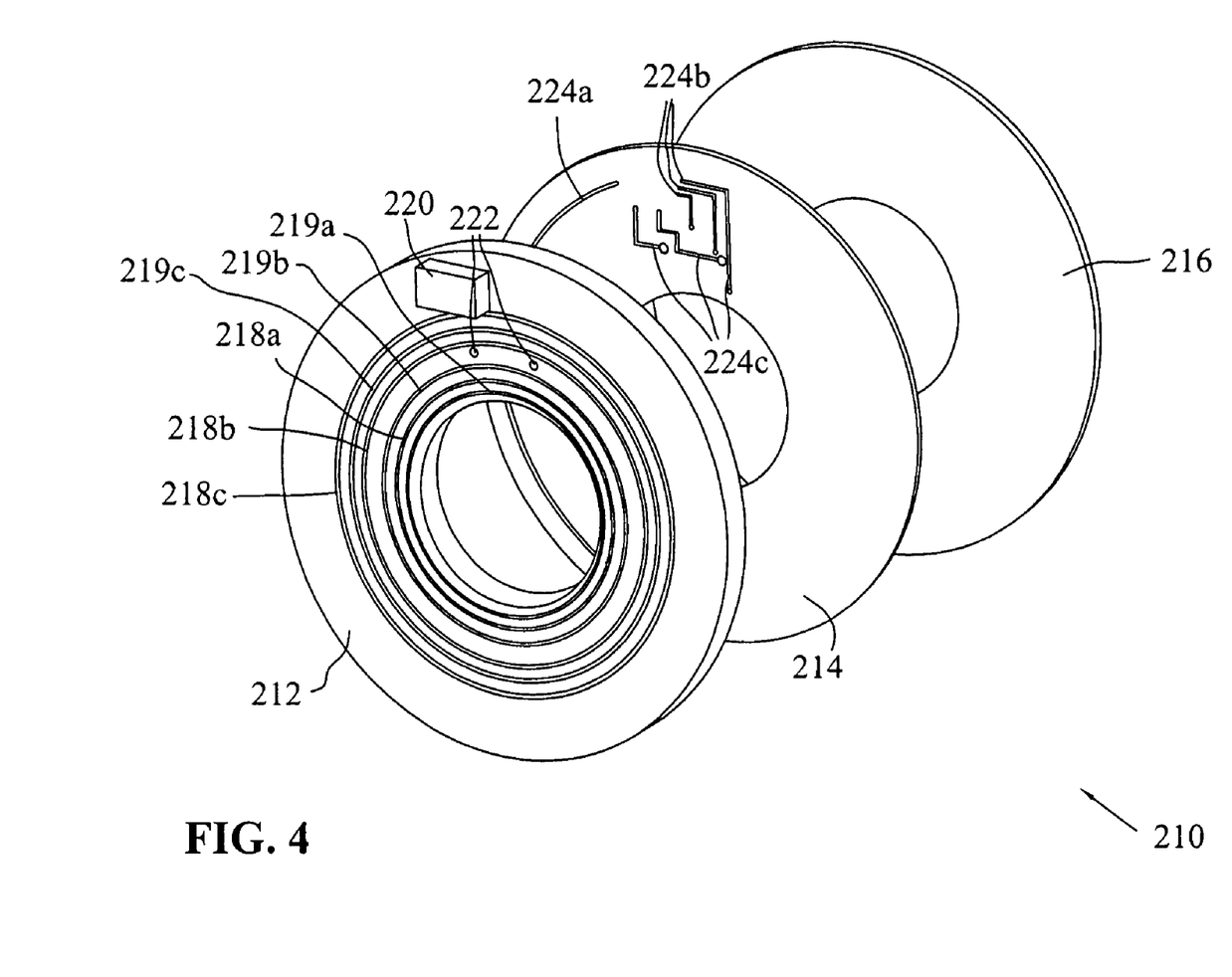
FIG. 4 shows a perspective exploded view of a multilayer seal ring having raised sealing rings with multiple leak detection sensor circuits (sensor rings) located between the seal rings on the opposing surfaces.

Referring now to FIG. 4, an exploded view of another alternate embodiment of a seal ring is generally indicated as 210. Seal ring 210 has a laminate structure including a contact face lamina 212, a center core lamina 214, and an opposing contact face lamina 216. The contact laminas 212 and 216 have concentric multiple sensor circuits (sensor rings) 218a, 218b, 218c alternated with sealing rings 219a, 219b, 219c on the outer surfaces of the laminas. Sensor rings 218a, 218b, 218c have electrical or optical conductors with small sensors of known art, such as reactive conductor sensors, capacitor sensors, optical strain sensors, or elastomer conductive sensors that detect the presence of a fluid or a change in pressure due to the presence of pressurized fluid. In the embodiment shown, sealing rings 219a, 219b, 219c have a thickness that is greater than the thickness of the sensor rings 218a, 218b, 218c (when measured from the corresponding outer surfaces of contact face laminas 212 and 216) and such that the sealing rings 219a, 219b, 219c make contact and seal with the mating surfaces of adjoining fittings. Sealing rings 219a, 219b, 219c may be made from a soft metallic tracing, such as silver, that is resistant to fluid corrosion and has adequate softness to provide a good seal. Sealing rings 219a, 219b, 219c may also be O-rings, such as a molded elastomer. The concentric sealing rings 219a, 219b, 219c also provide redundant sealing in addition to the ability to detect leak progression with sensor rings 218a, 218b, 218c. Also shown on lamina 212 is an integrated circuit (IC) 220 chip of known art that may include comparator circuits and transistor switches that identify changes in electrical readings and causes switching to initiate remote visual indication of leak progression or initiates the transmission of a modulated signal to a remote controller (not shown) and display that identifies the seal and the presence of leak propagation. The seal ring 210 includes two holes 222 that hold electrical terminations of known art that provide voltage and common ground to IC 220 and an adjacent pipe. Voltage potential and ground to the adjacent pipe may be achieved when adjacent pipes are mated, such as shown in FIG. 7a. In this embodiment, center core lamina 214 is a low dielectric material with conductive tracings 224a, 224b, 224c that provide electrical circuitry for the sensor rings, common ground, and IC 220. The lamina 216 has sensor rings 218a, 218b, 218c and sealing rings 219a, 219b, 219c on its mating contact surface (FIG. 5).

Figure 5:
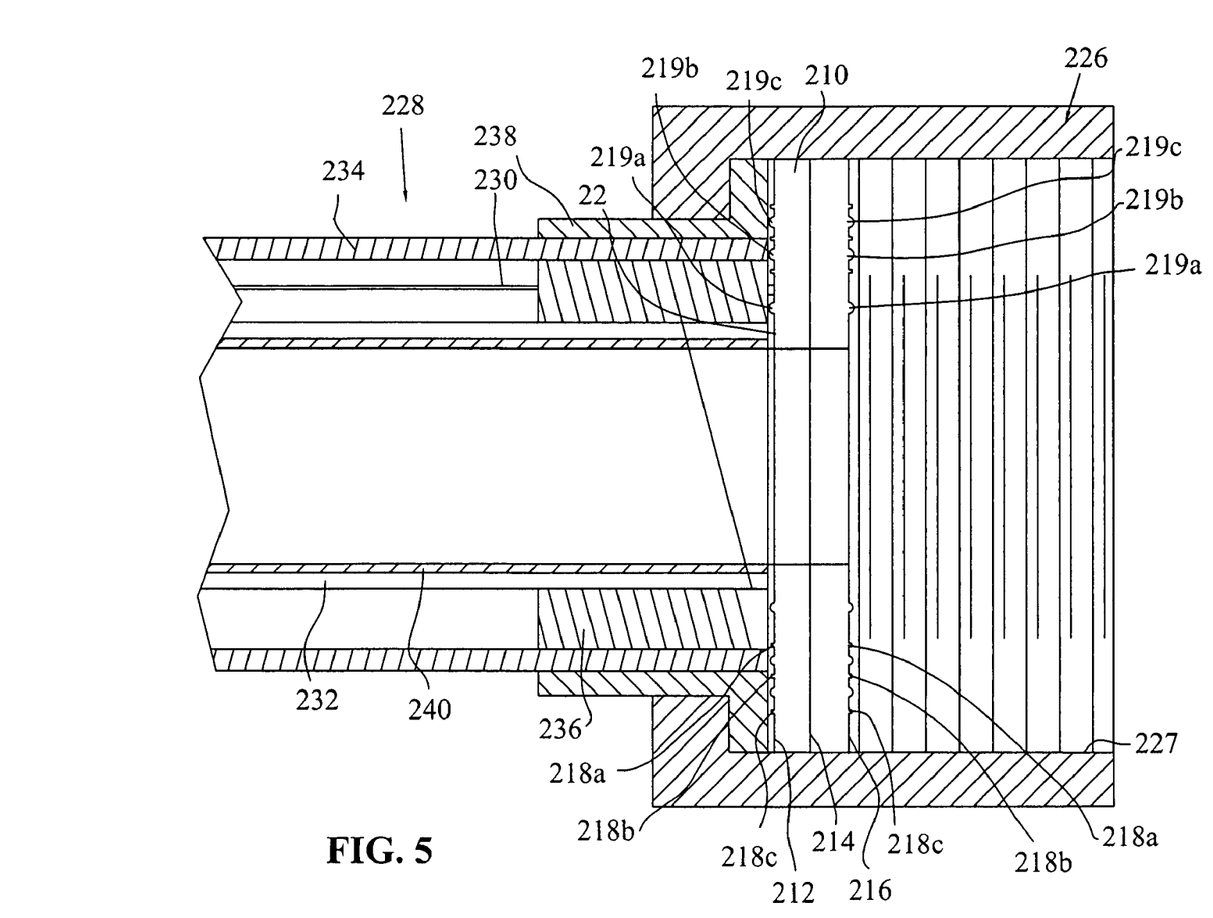
FIG. 5 shows a cross-sectional view of the seal of FIG. 4 shown placed within the female connection fitting of a pipe.

Now referring to FIG. 5, a cross-sectional view is shown with sealing ring 210 placed in a female fitting generally indicated as 226 having internal threads 227 that is attached to a pipe assembly generally indicated as 228. The cross-sectional view shows the raised and surface deposited sensor and sealing rings 218a, 218b, 218c and 219a, 219b, 219c, respectively. As shown, sealing rings 219a, 219b, 219c extend for a greater height from the respective contact face lamina's surface compared to the sensor rings 218a, 218b, 218c. This allows for the sealing rings 219a, 219b, 219c to seal against mating surfaces. Electrical voltage and ground are provided through conductors such as 230, which make contact with sealing ring 210 and an adjacent pipe (not shown). Pipe assembly 228 as shown in FIG. 5 has dual walls with an inner pipe wall 232, an outer pipe wall 234, and a liner 240. Similar to FIG. 3, this pipe assembly includes a cylindrical fitting insert 236 and a flange 238 that holds the female fitting 226 in place when threaded onto a male fitting (not shown) and provides for relative pipe positioning, sealing contact surface, and force transition between the outer and inner pipes.

This pipe configuration is independent of this seal invention and may be of a multitude of configurations. While the described pipe system supports the present seal invention with integrated conductors and control circuitry, the structural configuration of the pipe assembly may be of any known art including single walled pipe using homogeneous materials, single walled composite laminate pipe, polymer pipe, etc.

Figure 6:
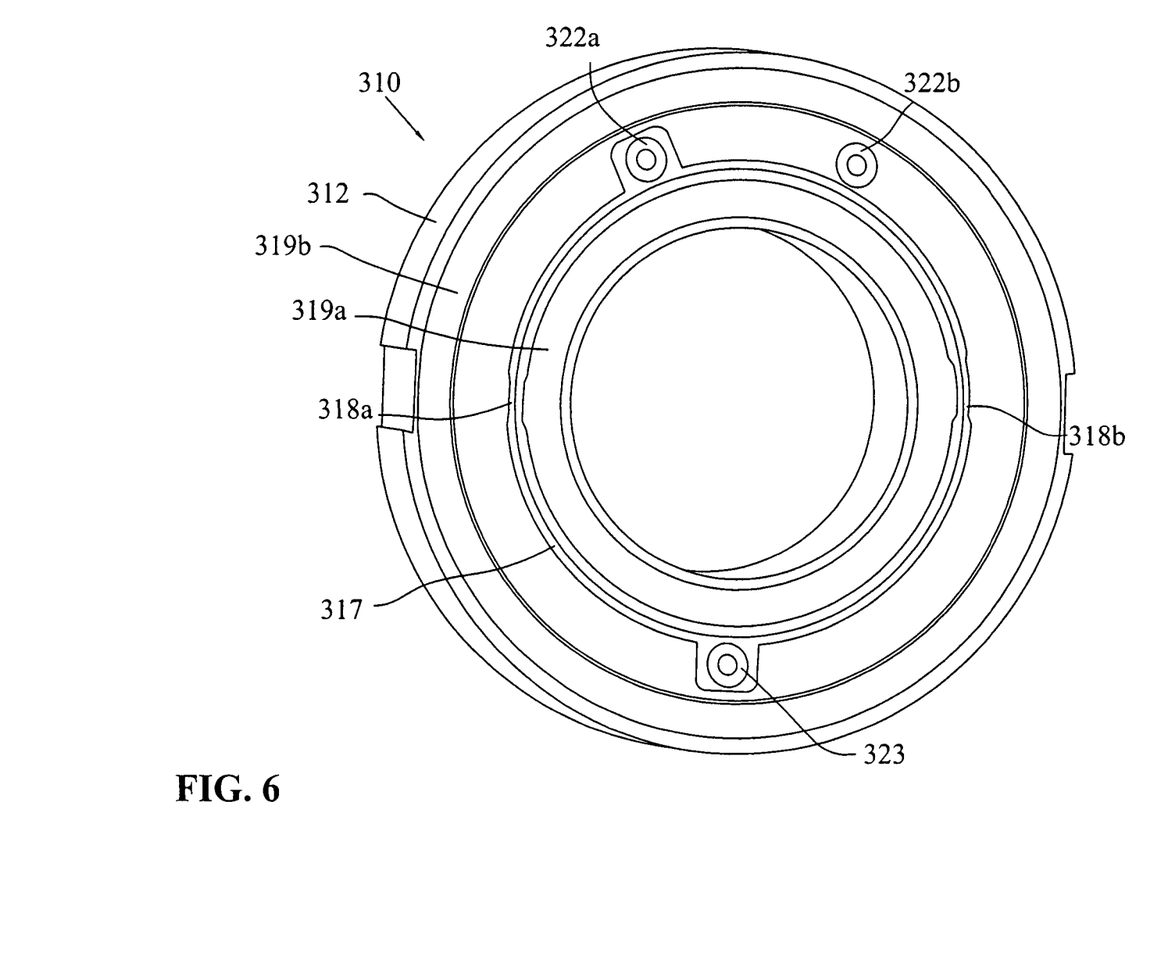
FIG. 6 shows a non-laminate seal ring having a single leak detection sensor circuit (sensor ring) between two O-rings on opposing contact surfaces and having female electrical pin connectors for connection to remote control circuitry.

Referring now to FIG. 6, another embodiment of a seal is shown generally indicated as 310, which has a solid seal body 312 of a preferably low dielectric material or alternately, may be coated with a low dielectric material. Each of the two opposite sealing sides of sealing ring 310 has a sensor ring 317 containing two reactive conductor sensors 318a and 318b. Sensor ring 317 is located between two concentric O-rings 319a, 319b, which are known and may be made of a resilient polymer material and inserted into channels commonly referred to as glands, on the main sealing faces of seal body 312. Power is provided to seal ring 310 by electrical connectors or contacts 322a and 322b. Connector 322a provides positive voltage to the sensor ring 317 on the side of seal body 312 shown in FIG. 6, and connector 322b provides positive voltage to the opposite side (not shown) of seal ring 310. A common ground is provided to both sides of the seal by connector 323. Sensors 318a and 318b may be any small sensor of known art including the aforementioned reactive conductor sensor, polymer composite sensor, capacitor sensors, etc.

Figure 7B:
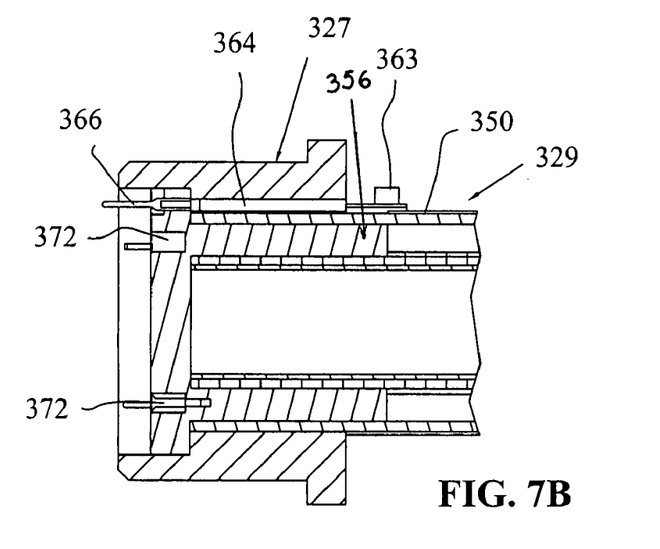
FIGS. 7b and 7c show additional cross-sectional views of one of the fittings of FIG. 7a that show remaining pin connectors and electrical lead paths.
Figure 7C:
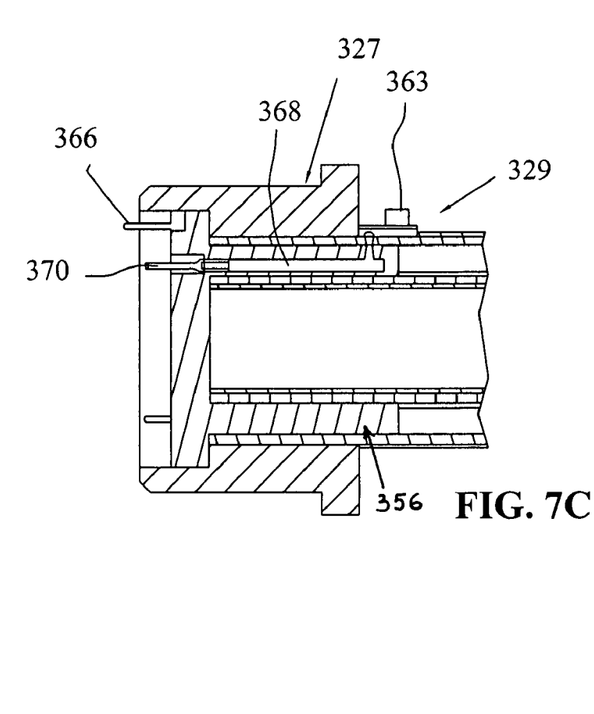

Referring now to FIGS. 7a through 7c, cross-sectional views are provided that show pipe fittings having the seal ring 310 of FIG. 6. FIG. 7a shows a female fitting generally indicated as 326 mated with male fitting generally indicated as 327 and having seal 310 at the connection between two dual-walled pipe assemblies generally indicated as 328 and 329. Pipe assembly 328 includes a conductor 330, an inner pipe wall 332, and an outer pipe wall 334. In this embodiment, conductor 330 is located and runs along outer pipe wall 334. Pipe assembly 328 also includes a flanged insert component generally indicated as 336, having a generally planar sealing surface/seat 337, a receiving flange 338 for receiving seal ring 310, and a cylindrical insert portion 339 positioned between inner pipe wall 332 and outer pipe wall 334. Pipe assembly 328 also includes a pipe liner 340.

Pipe assembly 329 also has a dual pipe configuration and includes an electrical conductor 350, an inner pipe wall 352, and an outer pipe wall 354. Pipe assembly 329 also includes a flanged insert component generally indicated as 356. Flanged insert component 356 includes a generally planar sealing surface/seat 357 for sealing against the opposite sealing surface of seal ring 310 that contacts planar sealing surface 337. Flanged insert component 356 also includes a cylindrical insert portion 359 that is inserted between inner pipe wall 352 and outer pipe wall 354 of pipe assembly 329.

Electrical circuit paths and pin connectors support the electrical operation of seal ring 310 as shown in FIGS. 7a thru 7c. In FIG. 7a, it can be seen that the assembly includes a male electrical pin contact 360 and a path for a common ground conductor 362 that provides an electrical ground to seal ring 310 and extends from pin contact 360 between inner pipe wall 352 and outer pipe wall 354 and exits outer pipe wall 354 where it is connected to ground (not shown). It should be appreciated that pin 360 is inserted into and connects with ground connector 323 on seal ring 310. A thin foil conductor may be wrapped around pipe assembly 329 from common ground conductor 362 to the ground of conductors 330 and 350. Pipe assembly 329 also includes an IC chip 363 that is electrically connected with conductor 350, which runs along the outside of pipe wall 354. In FIG. 7b, an electrical path 364, which receives current from conductor 350, has a male electrical pin contact 366 electrically connected thereto. Conductor path 364 and electrical pin contact 366 extend through and from flanged insert component 356 to be received in a connector (not shown) in flanged insert component 336 for providing voltage potential to pipe assembly 328 and conductor 330. Now referring to FIG. 7c, which is a rotated view compared to FIG. 7b, an electrical conductor path 368 extending through flanged insert component 356 is shown connected to an electrical pin contact 370. Electrical pin contact 370 and a similar electrical pin contact and conductor path provide voltage to seal ring 310 by connecting to connectors 322a and 322b. The electrical circuit paths described in this embodiment may be filled with electrical conducting material of a known art. Further, electrical pin contacts 360, 366, and 370 may be held in place with screws and cap material identified as 372, as shown in FIGS. 7a and 7b.

Figure 8:
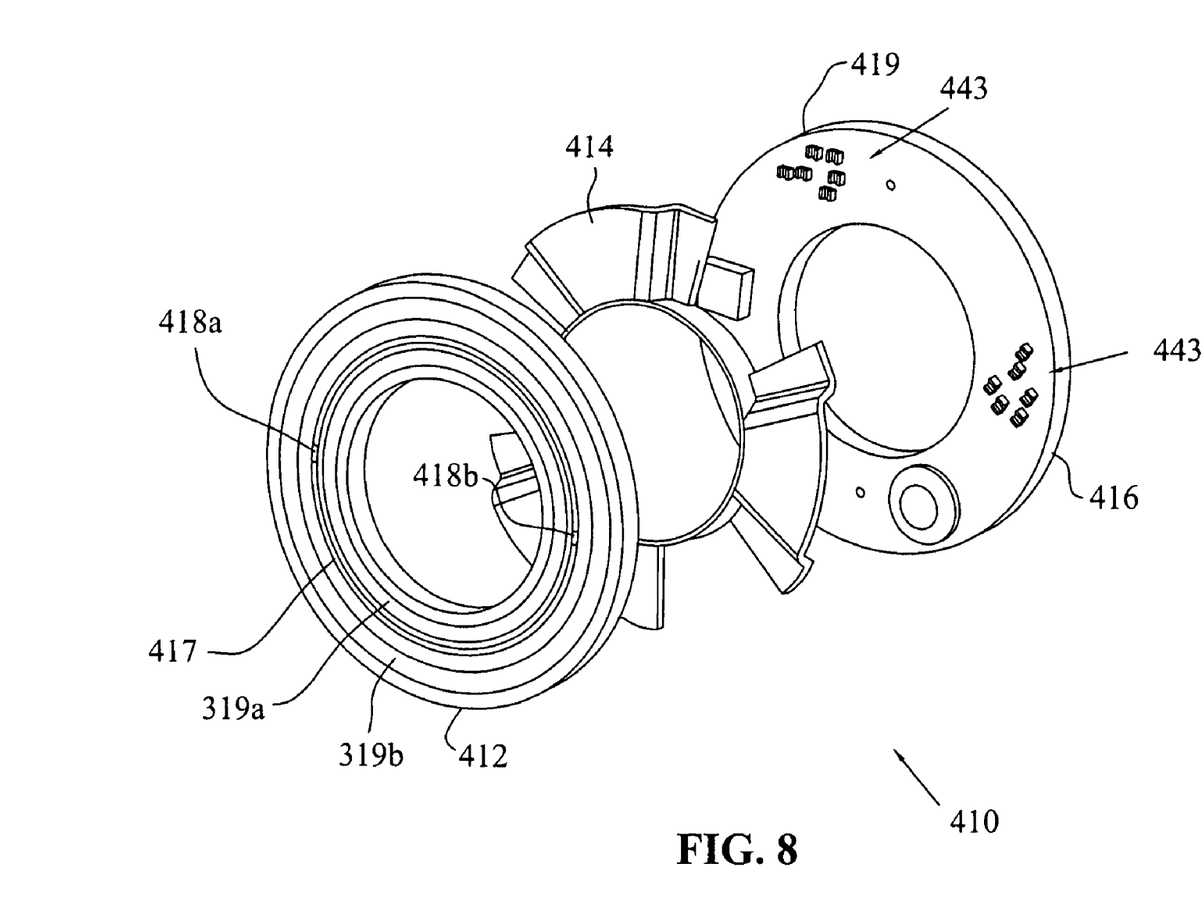
FIG. 8 shows a seal ring with sandwich construction having a single leak detection sensor circuit (sensor ring) between two O-rings on each contact surface and having a core element with a resident power source (battery) and control circuitry.

In FIG. 8, a seal member generally indicated as 410 with a sandwich construction is shown. Seal member 410 includes a contact face lamina 412, a core element 414, and an opposing contact face lamina 416. Similar to seal member 310, seal member 410 includes a sensor ring on the outer faces of laminates 412 and 416 that have reactive conductor sensors 318a and 318b thereon. Sensor ring 317 is located between concentric O-rings 319a, 319b, which have a height that is raised above sensor ring 317 from the surface of respective contact face laminas 412 and 416 for reasons discussed above regarding seal members 210 and 310. Additionally, sensor ring 417, reactive conductors sensors 418a, 418b, and O-rings 419a, 419b may be made using the same configurations and materials as discussed above for sensor ring 317, reactive conductor sensors 318a, 318b, and O-rings 319a, 319b. The core may be any configuration to provide structural integrity and may be filled with an encapsulate material (not shown) to cover and protect the electronics and power source. This seal member 410 is autonomous or self-sufficient with power and control circuitry contained within the seal, including a battery 441 and electronic components generally indicated as 443. In the event that the inner O-ring leaks, the fluid makes contact with sensors 418a, 418b causing a modulated RF signal to be sent to a remote transceiver (not shown) located near the seal. This transceiver may be part of a collar located next to each fitting containing the seal member. Upon receiving a signal from the seal member, the collar would provide a visual indication that leak propagation has occurred within the seal. The transmitted signal from the seal member may also be sent to fixed or handheld devices that can read the modulated signal and display the identification and location of the leaking seal.

Figure 9:
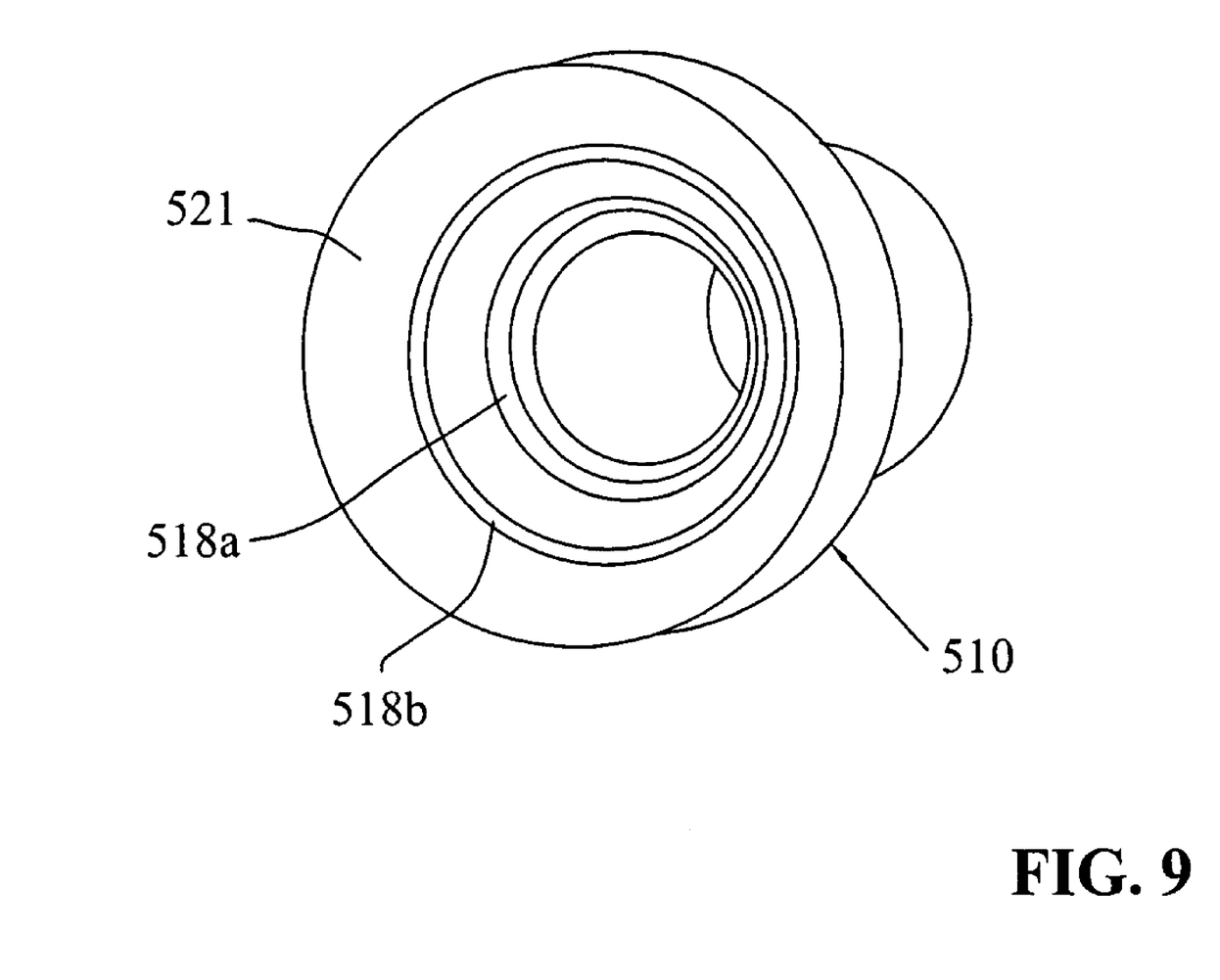
FIG. 9 shows a view of a tapered seal having two leak detection sensor circuits (sensor rings) located within recessed channels on a contact surface and having embedded circuitry and a remote or non-resident control circuit for use in a tapered compression fitting.

FIG. 9 shows a seal member generally indicated as 510, which may be used for a tapered compression fitting. Seal member 510 may be a separate discrete seal or an integral part of the compression fitting. Similar to the seals shown in FIGS. 1 through 3, this seal has multiple sensor rings 518a, 518b that are located in recessed channels. The seal is provided with a tapered surface 521 as is known in traditional tapered compression fittings.

Figure 10:
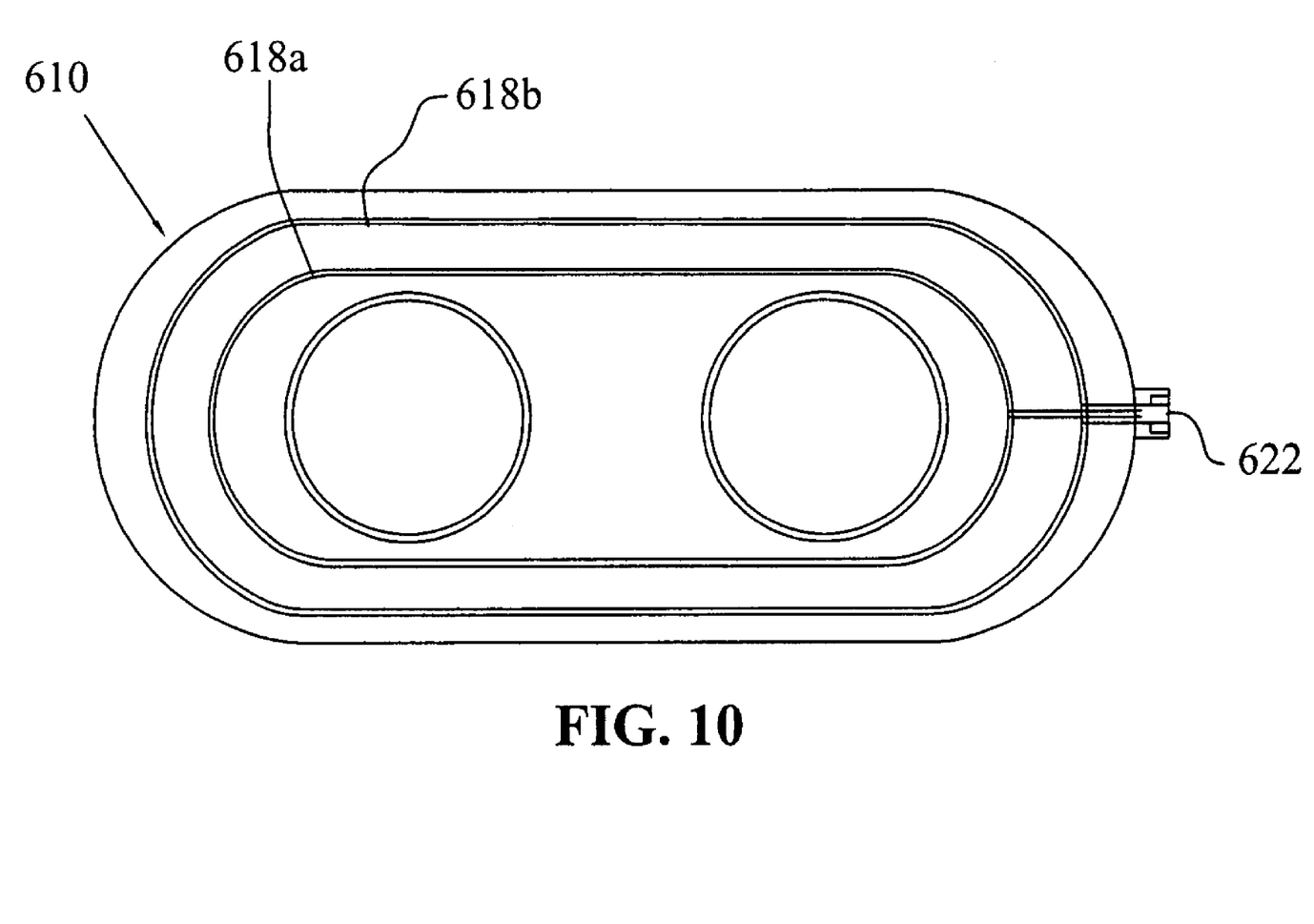
FIG. 10 shows a flat patterned (gasket) seal with two leak-detection sensor circuits located in depressions on each contact surface.

FIG. 10 shows a flat patterned seal member or gasket generally indicated as 610 that has multiple sensor circuits 618a, 618b located in depressions within the gasket. The electrical or optical signal source is provided to the gasket at a termination 622. Seal member 610 is intended to be used in an assembly as known for this type of seal and functions similar to the seals shown in FIGS. 1 and 3.

While the invention has been taught with specific reference to the above-described embodiments, one skilled in the art will recognize that changes can be made in form and detail without departing from the spirit and scope of the invention. For example, single layered structures may be substituted when appropriate for any of the laminate structures described above. Also, any suitable configuration may be employed for the core element described in FIG. 8. Also, the flat pattern shown in FIG. 10 may be of any useful configuration. In addition, the aforementioned sensor rings may have various configurations other than a full ring configuration including, but not limited to, half circle, quarter circle, single point, etc. The scope of the invention is, therefore, indicated by the following claims rather than by the description. Additionally, all changes that come within the equivalency of the claims are to be embraced within their scope.

What is claimed is:

1. A seal device with integrated leak progression detection capability comprising:
 a seal member, including at least two sealing contact surfaces and a sensing member located between said sealing contact surfaces, said sensing member detecting if a breach has occurred from a seal formed from one of said sealing contact surfaces and a member against which the one sealing contact surface is sealed to provide an indication of said breach before a breach of the seal formed from the other sealing contact surface and the member against which the other sealing contact surface is sealed occurs, said seal member having a laminate structure with laminas spaced axially from one another along an axis of the seal member.

2. The seal device as set forth in claim 1, wherein said contact surfaces have a ring configuration.

3. The seal device as set forth in claim 2, wherein said sensing member also has a ring configuration.

4. The seal device as set forth in claim 3, wherein said laminate structure includes at least three layers including two contact face laminas and a center core lamina.

5. The seal device as set forth in claim 4, wherein said center core lamina includes conductive traces.

6. The seal device as set forth in claim 5, including connector means electrically connecting said laminas.

7. The seal device as set forth in claim 1, wherein said sealing contact surfaces are raised above the major surfaces on said seal member.

8. The seal device as set forth in claim 7, wherein said sealing surfaces include O-rings.

9. The seal device as set forth in claim 1, wherein the seal member is a tapered compression fitting.

10. A seal device with integrated leak progression detection capability comprising:
 a seal member, including at least two sealing contact surfaces and a sensing member located between said sealing contact surfaces, said sensing member detecting if a breach has occurred from a seal formed from one of said sealing contact surfaces and a member against which the one sealing contact surface is sealed to provide an indication of said breach before a breach of the seal formed from the other sealing contact surface and the member against which the other sealing contact surface is sealed occurs, said seal member being a discrete unit and having a substantially disc-shaped configuration including at least two additional sealing contact surfaces and an additional sensing member located between said additional sealing contact surfaces, said two additional sealing contact surfaces and said additional sensing member located on a face of said seal member opposite a face having said two sealing contact surfaces and said sensing member.

11. The seal device as set forth in claim 10, including at least three concentric sealing contact surfaces and three concentric sensing members on each face of said seal member.

12. The seal device as set forth in claim 11, wherein said concentric sealing contact surfaces and said concentric sensing members are placed alternately on said opposite faces of said seal member.

13. A seal device with integrated leak progression detection capability comprising:
 a single discrete seal member having a seal faces on each of two opposite sides, said seal faces facing away from one another and at least two sealing contact surfaces on each of said faces and at least one sensing member attached to said seal member and located between the sealing contact surfaces on each contact face, one of said sensing members detecting if a breach has occurred of a seal formed between one of said sealing contact surfaces and an opposing member against which the one sealing contact surface was sealed.

14. The seal device as set forth in claim 13, wherein said one sensing member detects said breach and an indication of said breach is provided before a breach of a seal formed between the other sealing contact surface on the same seal face and the opposing member.

15. The seal device as set forth in claim 14, wherein said sealing contact surfaces extend to a height higher above the respective seal faces than said sensing members.

16. The seal device as set forth in claim 15, wherein said sealing contact surfaces are formed with a soft metal.

17. The seal device as set forth in claim 15, wherein said sealing contact surfaces are formed from a polymer.

18. The seal device as set forth in claim 13, wherein said sensing members are located in channels in said seal faces.

19. The seal device as set forth in claim 13, wherein said sealing contact surfaces are formed by members, which are at least partially located in channels formed in said seal faces.

20. A pipe connection including a seal device with integrated leak progression detection capability comprising:
a pair of pipes, each having an end;
a pair of fittings, connecting said ends of said pipes, each fitting having a seat surface;
a discrete seal member separate from and located interstitially between opposing seat surfaces on said pair of fittings and having at least one seal face and first and second sealing contact surfaces on said seal face and at least one sensing member located between the first and second sealing contact surfaces, said first and second sealing contact surfaces forming a redundant seal against an opposing seat surface on one of said fittings, said sensing member detecting if a breach between one of said first or second sealing contact surfaces and the seat surface has occurred before a total breach of the redundant seal has occurred; and
electrical connection and circuit paths providing a voltage to said sensing member.

21. The pipe connection as set forth in claim 20, wherein said fittings are tapered compression fittings.

22. The pipe connection as set forth in claim 21, wherein said seal member is contained in a tapered surface of one of said compression fittings.

23. The pipe connection as set forth in claim 20, wherein said seal member includes another seal face on an opposite side of the seal member having third and fourth sealing contact surfaces and another sensing member located between the third and fourth sealing contact surfaces.

24. The pipe connection as set forth in claim 20, wherein said first and second sealing contact surfaces are concentric.

25. The pipe connection as set forth in claim 20, wherein at least one of said pipes is a dual wall pipe having an inner wall and an outer wall.

26. The pipe connection as set forth in claim 25, wherein at least a portion of said circuit paths is located between said inner wall and said outer wall of said dual wall pipe.

27. A seal device with integrated leak protection detection capability comprising:
a discrete seal member having a thin planar configuration that is configured to be located between and seal with two sealing seats, the seats being located on respective fluid carrying members at a joint joining the fluid carrying members, said seal member including at least one sealing contact surface and a sensing member mounted on said seal member and located externally to a seal formed from said sealing contact surface and a member having one of said sealing seats against which the sealing contact surface is sealed, said sensing member detecting if a breach of said seal has occurred to provide an indication of said breach.

28. The seal device as set forth in claim 27, wherein said sealing contact surface is raised above a face of said seal member on which said sealing contact surface is located.

29. The seal device as set forth in claim 28, wherein said sealing contact surface is located on a flexible member at least partially contained in a channel in said face.

30. The seal device as set forth in claim 27, wherein said sensing member is at least partially located in a channel of a face of said seal member.

31. The seal device as set forth in claim 27, wherein said seal member is a tapered compression fitting.

32. The seal device as set forth in claim 27, wherein said seal member is a flat patterned gasket.

33. The seal device as set forth in claim 27, wherein said sensing members include a reactive sensing material.

34. A method of providing a seal with integrated leak progression detection capability comprising the steps of:
providing a fluid carrying member having a fluid path and a sealing contact face configured to form a seal with another member;
providing a seal member, including a contact face configured to seal against said contact face of said fluid carrying member and at least two concentric first and second sealing contact surfaces on said contact face and further including at least two concentric sensing members also on said contact face with one of said sensing members located between said first and second sealing contact surfaces and said other sensing member located to the exterior of said sealing contact surfaces;
forming seals between said sealing contact surfaces of said seal member and said contact face of said fluid carrying member, wherein when said seals are intact, said sensing members are not in contact with any fluid in said fluid carrying member;
sensing a leak between said seal of said first sealing contact surface and said sealing contact face of said fluid carrying member from fluid contacting said sensing member located between said sealing contact surfaces, said sensing member providing an electronic signal that the seal between said first sealing contact surface and said contact face has been breached; and
sensing a leak between said seal of said second sealing contact surface and said sealing contact face of said fluid member from fluid contacting said sensing member located to the exterior of said sealing contact surfaces, said sensing member providing an electronic signal indicative that the seals between both of said sealing contact surfaces and said contact face of said fluid carrying member have been breached.

35. The method of providing a seal with integrated leak progression detection capability as set forth in claim 34, further including a third concentric sealing contact surface, forming a redundant seal that can still be intact even when said sensing member located to the exterior of said at least two concentric sealing contact surfaces has sensed a breach of said seals formed between said first and second concentric sealing contact surfaces and said contact face of said fluid carrying member.

36. The method of providing a seal with integrated leak progression detection capability as set forth in claim 34, wherein said seal member includes a second contact face on a side of said seal member opposite the other contact face, said second contact face including concentric third and fourth sealing contact surfaces and at least two concentric sensing members with one of said sensing members located between said third and fourth sealing contact surfaces.

* * * * *

UNITED STATES PATENT AND TRADEMARK OFFICE
CERTIFICATE OF CORRECTION

PATENT NO.       : 7,316,154 B1
APPLICATION NO.  : 11/090527
DATED            : January 8, 2008
INVENTOR(S)      : Barton E. Bennett It is certified that error appears in the above-identified patent and that said Letters Patent is hereby corrected as shown below:

In claim 13, line 3, please delete the word "faces" and insert --face--.

Signed and Sealed this

Twenty-ninth Day of April, 2008

JON W. DUDAS
*Director of the United States Patent and Trademark Office*